United States Patent Office 3,151,282
Patented Sept. 29, 1964

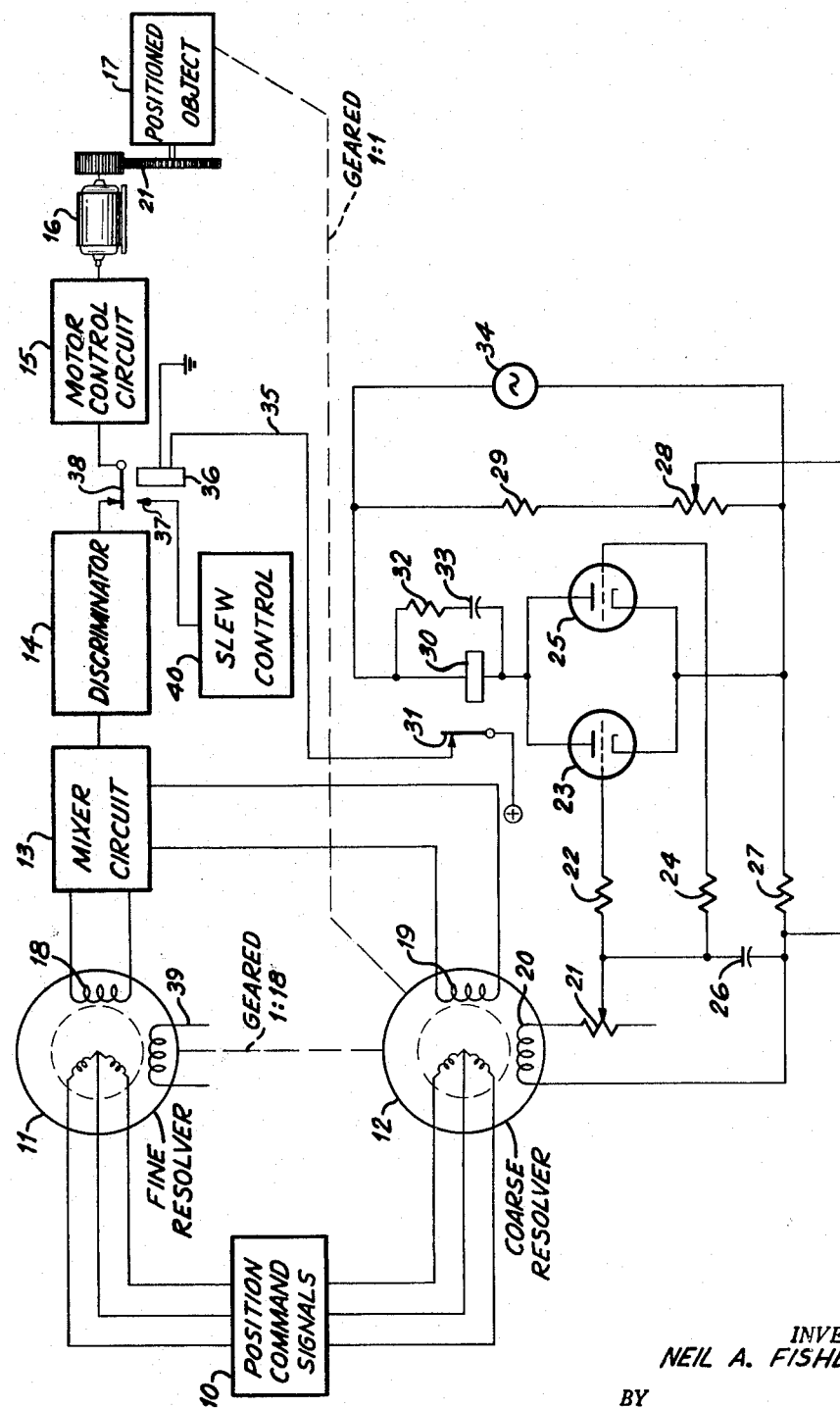

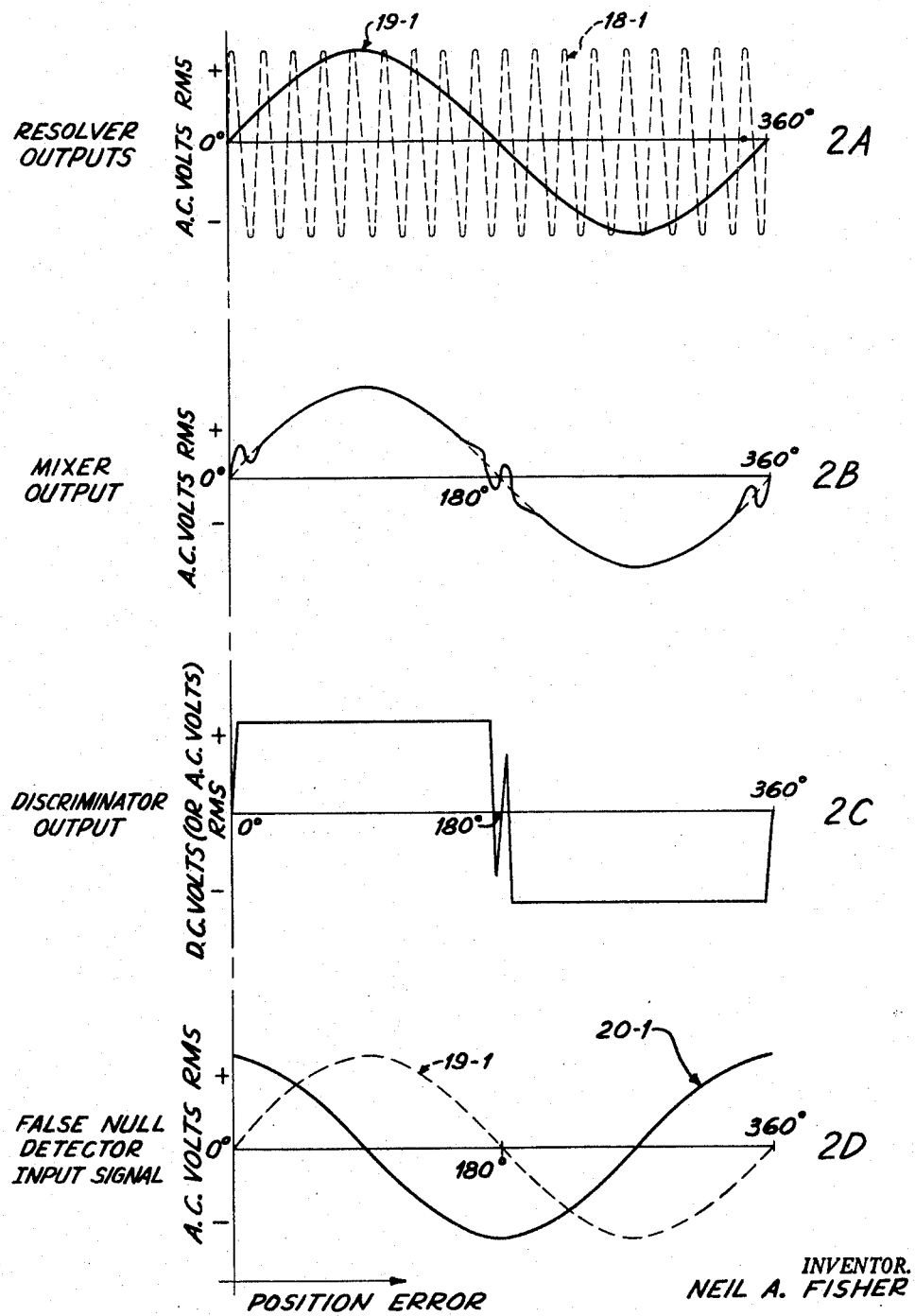

3,151,282
EXTENDED RANGE POSITIONING CONTROL SYSTEM
Neil A. Fisher, Waynesboro, Va., assignor to General Electric Company, a corporation of New York
Filed June 7, 1961, Ser. No. 115,457
5 Claims. (Cl. 318—28)

This invention relates to positioning control systems, and particularly to positioning control systems wherein ambiguous or erroneous positioning is detected and automatically corrected.

Existing positioning control systems provide for the positioning of an object in response to command signals. For example, the object may be the work table of a machine on which a piece of stock is mounted and the command signals may be part of a program for machining the stock to finished specifications. Such control systems take the form of servomechanisms or "follow-up control systems" wherein the input to the system is the position command signals and the output of the system is the actual position of the object. The output is fed back and compared with the position command signals in order to develop an error indication which controls positioning equipment for moving the object in a direction to eliminate the deviation between the command signal and the actual position of the object.

Typical servomechanisms employ selsyns or synchro transformers to develop control signals for positioning the object. These devices have rotor and stator windings so arranged that energization of one group of windings by position command signals induces voltages in the other group having a magnitude and polarity indicative of the orientation of the rotor with respect to the stator. Generally, a complete revolution of the rotor causes the magnitude of the voltage induced in the stator windings to trace a complete sinusoid when plotted as a function of rotor position. The voltage induced in the stator windings controls positioning equipment which drives the object in the direction required to match the object position to that directed by the position command signals. By coupling the object to the rotor windings, repositioning thereof reduces the voltage induced in the stator windings until it becomes zero at the time the object position corresponds to the position commanded.

In order to develop systems for positioning objects with greater accuracy, it is common practice to employ a plurality of synchros. Such systems employ a "coarse" synchro, the rotational displacement of which directly represents the total range of motion of a coupled object, and successively "finer" synchros, complete rotations of which represent successively smaller fractions of the total range of motion of the coupled object. For reasons described hereinafter, many systems using multiple synchros with an even gear ratio between the synchros are subject to ambiguity in positioning because they do not discretely distinguish a position error of 0° from a position error of 180°. Conventionally, this ambiguity at 180°, termed a "false null," is avoided by limiting successive position changes to less than 180°, or by utilizing less than the first 180° of rotor displacement of the coarse synchro for the entire positioning range; or, in other words, by limiting the maximum position error to less than 180° rotation of the coarse synchro.

An object of the present invention is to provide a positioning control system of the described type, permitting control of 360° of rotary motion of an object with no limitation upon the maximum position error or upon multiple rotations of the controlled motion.

Another object of the invention is to provide a system wherein positioning on a false null is impossible.

Still another object of the invention is to provide a false null detection circuit and means for detecting position errors within a selected range of the false null.

Erroneously positioning the object at a false null may be prevented by generating a discrete signal whenever the position error is in the vicinity of the false null. This discrete signal may then be used to either prevent positioning in the area or if positioning has already occurred, to remove the object therefrom.

A feature of the invention resides in means for generating a signal having discretely different characteristics when the position error is in the range of 0° than when the position error is in the range of 180°.

Another feature of the invention relates to means responsive to position errors in the range of 180° for overriding the normal position control signal and slewing the object away from the false null area.

Another feature of the invention resides in the employment of resolvers in a positioning feedback system in order to yield both direct control of object positioning and discrete signals for false null detection.

In the following illustrative embodiment of the invention, a pair of resolvers are used to control positioning of an object in response to command signals. Each resolver has two orthogonally positioned rotor windings and at least one stator winding. In addition, one resolver has an additional stator winding 90° displaced from the first stator winding. Position command signals varying with the sine and cosine of the desired angular position (or a multiple thereof) are connected to the individual rotor windings of each resolver. In response to the command signals, error voltages are induced in the stator windings indicative of the deviation between the desired angular position and the actual position of the object. Positioning equipment responds to the error signals to reposition the object which is coupled to the rotor windings and hence reduces the error signal to zero when positioned in accordance the command signal. Protection against erroneous positioning on a false null is afforded by a false null detecting circuit responsive to signals induced in the 90° displaced stator winding. These signals are of different polarity for position errors of 0° or 180° and are used to control take-over circuitry which automatically assumes temporary control of positioning whenever the position error is within a preselected range encompassing the false null. The take-over circuitry operates to slew the object outside of the preselected range and thereupon permits further positioning to resume under control of the error signals.

The features of the invention which are believed to be novel are set forth with particularity in the appended claims. The invention itself, however, both as to its organization and method of operation, together with further objects and features thereof, may best be understood by reference to the following description taken in conjunction with the accompanying drawings wherein:

FIG. 1 is a schematic drawing showing the general functions of a normal position control system and the circuit details of the false null protection system of the instant invention; and FIG. 2 comprises a plurality of waveforms illustrative of the signals present at selected points in the above system under conditions representing a complete range of possible position errors.

A positioning control system in accordance with the invention is illustrated in FIG. 1. The system comprises a "coarse" and a "fine" resolver 12 and 11, each having rotor and stator windings. The rotor windings are individually supplied by position command signals 10 so as to induce error voltages in stator windings 18 and 19, representative of the deviation between the present position of the rotor and the commanded position. Windings 18 and 19 are connected to a mixer circuit 13, wherein the error voltages are "weighted," i.e. given relative importance in accordance with the magnitude of position error. As more fully explained hereinafter, when the resolution of the output from coarse resolver 12 is poor, mixer 13 provides an output which is primarily derived from fine resolver 11, and vice versa. The weighted error signal from mixer 13 is applied to a discriminator 14 wherein it is converted to an output voltage the polarity of which is determined by the polarity of the error signal. Normally closed contacts 38 interconnect discriminator 14 with motor control circuit 15, which responds to the discriminator output by rotating motor 16 either clockwise or counter-clockwise in accordance with the polarity thereof and at a speed proportional to the magnitude thereof. Motor 16 is coupled, for example by gears 21, to positioned object 17, and consequently drives the object in a direction to reduce the deviation between its position and the commanded position. The positioned object 17 is coupled to the rotor of coarse resolver 12, e.g. with gears, to yield a complete revolution of the rotor for a complete revolution of the object. Coarse resolver 12 is further coupled to fine resolver 11 to yield eighteen rotor revolutions for each complete revolution of the rotor of coarse resolver 12. Obviously, the described coupling results in fine resolver 11 making a complete revolution for every 20° of position change.

The system described above is similar to that described in Patent No. 2,764,720, issued to L. U. C. Kelling on September 25, 1956. In the cited patent, synchro control transformers are used rather than the instant resolvers; however, mixer circuit 13, discriminator 14, and motor control circuit 15, may advantageously take the form of take-over circuit 22, discriminator 51, and reversing motor control circuit 3, described therein.

In accordance with circuit operation now to be described in detail, when the deviation between existing position and commanded position yields a position error in the false null area, relay 36 is energized by the false null detecting circuit described hereinafter and removes discriminator 14 from control of the motor control circuit 15 by opening contacts 38. Relay 36 thereupon closes contacts 37 connecting slew control 40 to motor control circuit 15. The slew control circuit 40 comprises a constant voltage of proper magnitude and polarity to cause motor control circuit 15 to drive the positioned object 17 outside of the range of the false null. Any suitable means may be adopted for fabrication of slew control 40.

The waveforms in FIG. 2A represent the magnitude of error voltage induced in stator windings 18 and 19 for each position error from 0° to 360°. When an alternating current modulated by $K \cos \theta$ and $K \sin \theta$ is individually applied to each of the orthogonally disposed rotor windings of a resolver, an alternating current is induced in the stator windings which is indicative of the deviation between the present orientation of the rotor with respect to the stator and that represented by the angle of the input signal, $\theta$. The applied voltages establish a magnetic field having an orientation with respect to the rotor windings such that when positioned object 17 is positioned 0° from a reference position, no voltage will be induced in the error signal stator winding of either resolver. In the circuit of FIG. 1, $\theta$ represents the angle at which positioned object 17 is to be positioned. Because of the 1:1 coupling between positioned object 17 and coarse resolver 12, the operation of coarse resolver 12 and input signals thereto will be identical to that just described. The position command signal input to fine resolver 11, in order to correspond to the 1:18 coupling between it and the coarse resolver must necessarily be modified and consequently takes the form of an alternating current modulated by $K \cos 18\theta$ and $K \sin 18\theta$.

The circuitry for generating the described position command signals is not germane to the invention but may take form similar to the programmed voltage sources illustrated in patent application Serial No. 830,874, filed July 31, 1959, by L. U. C. Kelling, and assigned to the General Electric Company, assignee of the present invention.

Waveform 18-1 in FIG. 2A represents the sinusoidal voltage induced in stator winding 18 of the fine resolver 11 for each position error from 0° to 360°. Waveform 19-1 in FIG. 2A represents the voltage induced in stator winding 19 of coarse resolver 12 for each position error from 0° to 360°. It will be apparent that a complete cycle of voltage values is induced in stator winding 18 for every 20° change of position error, whereas a complete cycle of error voltages is induced in stator winding 19 for every 360° change of position error.

Observation of the resolver outputs shown in FIG. 2A illustrates the vernier effect obtained by the inclusion of a fine resolver in a positioning control system. The magnitude of error signal induced in stator winding 19 when the position error is in the region of 0°, 180°, and 360° is low. If this magnitude is used exclusively for control of the positioning equipment, little resolution or accuracy is possible. Due to the output of fine resolver 11, which has a relatively rapid rate of change at these same points, it is possible to control positioning equipment with greater accuracy and resolution in accordance with the fine resolver output in these areas of position error. On the other hand, when the position error is in the range of 90° or 270°, the voltage magnitude of the output from the coarse resolver is most desirable for control and the output from the fine resolver is of insignificant importance. The function of mixer circuit 13 is to provide this discrimination between the resolver outputs and supply at the output thereof a weighted error signal which gives relatively greater importance to the output of fine resolver 11 in the areas of 0°, 180°, and 360° and which gives relatively greater importance to the output of coarse resolver 12 in the areas of 90° and 270°.

The waveform of the mixer circuit 13 output, shown in FIG. 2B, illustrates the variation in amplitude of the error signal for position errors from 0° to 360° inclusive. It should be of course understood that the waveform illustrated in FIG. 2B is illustrative only and is designed to graphically illustrate the effect of mixer circuit 13 in the summation of outputs from stator windings 18 and 19.

As shown in FIG. 2C, the weighted error signal from mixer circuit 13 is supplied to a discriminator 14 similar to that illustrated in the aforecited patent wherein it is amplified and converted to a substantially constant amplitude output having a polarity determined by the polarity of the weighted error signal. It should be noted that the discriminator output in FIG. 2C can be either alternating current for an A.C. servo system, or direct current for a D.C. servo system. In this example it can be assumed that a D.C. servo system exists. The discriminator output in FIG. 2C directly determines, through motor control circuit 15, the direction of rotation of motor 16 in order to correct a position deviation. Thus, it may be assumed that whenever the discriminator output is positive, the motor will rotate in a counter-clockwise direction and whenever the discriminator output is negative, the motor will rotate in a clockwise direction in order to position the object in the location desired.

FIG. 2C graphically illustrates why a false null at 180° will cause erroneous positioning. At 180° the discriminator output changes polarity from negative to positive and, consequently, the motor which initially had been attempting to correct in a clockwise direction, is reversed and driven counter-clockwise, until it stabilizes at 180°. In other words, 180° is a stable null similar to the true nulls at 0° and 360°. As previously mentioned, avoidance of positioning at this false null is a fundamental object of the invention.

Because the general positioning circuitry is subject to erroneous positioning at the false null, it is necessary to over-ride it when in a false null area. This is accomplished in accordance with the invention by developing a signal in one of the resolvers that is at maximum magnitude when the normal error signal from the coarse resolver is at minimum magnitude. It has been found advantageous to develop such a signal in the coarse resolver and the waveform illustrative thereof is shown in FIG. 2D. In FIG. 2D, the voltage induced in error signal winding 19 and the voltage induced in false null detecting winding 20 are both plotted as a function of position error. Waveform 20–1, which represents the voltage induced in false null detection winding 20 will be seen to lead waveform 19–1, representing the voltage induced in error signal winding 19, by 90° of position error. The result of this leading phase angle is that the voltage in false null detection winding 20 is negative at 180° and positive at 0° and 360°. As described hereinafter, relay 36 in FIG. 1, is controlled by the voltage induced in the false null detection circuit so that it will be energized during the negative portion of the waveform 20–1 and consequently, during this negative portion, slew control 40 directs the positioning of positioned object 17.

The false null detection voltage induced in stator winding 20 is applied through the common variable resistor 21 and grid resistors 22 and 24 to the grids of triodes 23 and 25 respectively. These triodes have their plates and cathodes connected together, and they are serially connected with a relay 30 to an alternating current source 34. Alternating current source 34 supplies a signal that is in phase with the output of stator winding 20 when the position error is less than 90° or greater than 270°, i.e., when curve 20–1 of FIG. 2D is above the horizontal axis. The described connection insures operation of relay 30 when triodes 23 and 25 are rendered conductive by the application of a correct voltage to their grids from stator winding 20. The two triodes (23 and 25) are operated in parallel because in some applications the source 34 may not be of sufficient voltage to insure energizing relay 30 and a single amplifier would therefore be ineffective. Also, failure of one triode will not render the circuit inoperative if either triode alone can energize relay 30.

Under the condition of a position error either less than 90°, or greater than 270°, as shown in FIG. 2D, a positive voltage is applied from stator winding 20 to the grids of triodes 23 and 25. A positive voltage is one which is in phase with the reference voltage from source 34. Thus, under the above condition, during the positive half cycles of the voltage supplied by source 34, the grid signal from stator winding 20 will also be plus causing triodes 23 and 25 to draw current and relay 30 to be energized in the circuit comprising, source 34, relay 30, and triodes 23 and 25 in parallel. Capacitor 33, in series with resistor 32, shunts the relay windings and in conventional manner prevents deenergization thereof during the negative half cycles of the voltage from source 34. When not in a region of false null, relay 30 is continuously energized, contacts 31 are open, and relay 36 is deenergized so that positioning is controlled by the resolver error signals as translated through discriminator 14 to motor control circuit 15.

When a combination of the position command signals and the position of resolver 12 result in a position error within the range from 90° to 270°, the voltage applied from stator winding 20 to the grids of triodes 23 and 25 is negative and relay 30 cannot be energized. At this time, relay 36 operates in the circuit comprising: a positive potential, normally closed contacts 31, conductor 35, the windings of relay 36, and ground. Operation of relay 36 severs the connection between discriminator 14 and motor control circuit 15 and closes contacts 37 to establish a new control path. This new control path consists of slew control 40, contacts 37, and motor control circuit 15. Under control of the voltage from slew control 40, positioned object 17 is removed from the region of false null.

In addition to the above circuit, a normally open contact on relay 30 (not shown) may be located in an error circuit of the information portion of the control system, so that should relay 36 fail to provide the required slewing action, and the object 17 be positioned on a false null, subsequent control and machine operation would be prevented as long as the object is positioned on a false null. Should relay 30 fail, subsequent operation would also be prevented.

Obviously, the coupling between positioned object 17 and the resolvers 11 and 12 insures that once it is removed from the false null area the voltages induced in stator winding 20 will no longer be of negative polarity and therefore triodes 23 and 25 will be rendered conductive. Conduction of triodes 23 and 25 re-establishes the energization circuit of relay 30 and it operates, disrupting the energization of relay 36 at contacts 31. With deenergization of relay 36, contacts 38 are closed and the resolvers are again placed in control of the positioning circuitry.

In order to limit operation of the false null detection circuitry to a shorter range than between 90° and 270°, potentiometer 28 in series with resistor 29 is connected across alternating current source 34. Control of potentiometer 28 permits bias adjustment of triodes 23 and 25 which effects the point in the operating cycle at which the grid signal assumes control of conduction. Phase adjustments to insure proper bracketing of the false null area, and greater sensitivity to the signal from winding 20, are provided by variable resistor 21 and capacitor 26; resistor 21 being in series with the grid supply voltages, and the capacitor 26 being in parallel therewith.

The preceding description has illustrated the generation of a discrete signal from which controls can be developed for detecting and avoiding false null positioning. It should be recognized that a plurality of arrangements are possible for the development of such a false null detection signal. For example, in the immediate area of the false null, the voltage on stator winding 39 of fine resolver 11 is positive and might be compared with the voltage on stator winding 20 to obtain a discrete false null indicating signal. Furthermore, although the illustrative embodiment has described a rotary positioning system, the teachings are applicable to systems wherein linear motion is controlled by rotating devices.

While there has been shown a particular embodiment of the invention it will, of course, be understood that it is not wished to be limited thereto since modifications can be made both in the circuit arrangements and in the instrumentalities employed and it is contemplated in the appended claims to cover any such modifications as fall within the true spirit and scope of the invention.

What is claimed as new and desired to be secured by Letters Patent of the United States is:

1. In a system for positioning an object, a source of command signals representing selected rotational positions of said object, means responsive to said command signals to establish a discretely oriented magnetic field within a range of 360° for each desired position of said object, a first winding located within said magnetic field, a second winding located within said magnetic field and orthogonally disposed with respect to said first winding, a source of voltage independent of said source of command signals, positioning means for positioning said object in response to voltages, and switching means controlled by voltages induced in said second winding to establish control over said positioning means by voltages induced in said first winding or by said source of voltage in accordance with whether said magnetic field is rotationally oriented in the region of 0° or 180° with respect to said second winding.

2. In a system for positioning an object, a source of command signals representing selected rotational positions of said object, means responsive to said command signals to establish a discretely oriented magnetic field within a range of 360° for each desired position of said object, a first winding located within said magnetic field, a second winding located within said magnetic field and orthogonally disposed with respect to said first winding, first control means operative to selectively produce control voltages in response to voltages induced in said first winding, second control means producing a predetermined voltage output, positioning means for positioning said object in response to control voltages, means interconnecting said first control means and said positioning means when said magnetic field is rotationally oriented in the region of 0° with respect to said second winding, and means for severing said interconnection and connecting said second control means and said positioning means when said magnetic field is rotationally oriented in the region of 180° with respect to said second winding.

3. In a system for positioning an object, a source of command signals representing selected rotational positions of said object, a first resolver including a rotor winding energized by said command signals to establish a magnetic field discretely representative of said selected positions, a second resolver including a rotor winding energized by said command signals to establish a magnetic field representative of a discrete multiple of said selected positions, individual stator windings located within the magnetic field of each said resolver, control means simultaneously responsive to the voltages induced in said individual stator windings to develop control voltages in accordance with relation between said command signals and position of said rotor windings, a source of voltage, object positioning means responsive to voltages to position said object, an additional stator winding located within the magnetic field of said first resolver and orthogonally disposed with respect to said individual stator winding therein, and switching means controlled by voltages induced in said additional stator winding as a result of the relation between said command signals and rotor position of said first resolver to selectively connect said object positioning means to either said control means or said source of voltage.

4. In a system for avoiding false null positioning of an object by a servomechanism arrangement employing a plurality of rotary transformers having rotor windings coupled to said object, a source of command signals representing selected rotational positions of said object, control means responsive to said command signals for developing an error voltage in accordance with the deviation between said selected position and the actual position of said object, the magnitude of said error voltage when plotted as a function of deviation forming a substantial sinusoid over a range of 360° of deviation, false null detecting means responsive to said command signals for developing a 0° deviation voltage when said deviation is substantially 0° and a 180° deviation voltage when said deviation is substantially 180°, a source of voltage independent of said source of command signals, positioning means selectively responsive to voltages for positioning said object, and switching means operative when said false null detecting means develops said voltage at 180° deviation to connect said source of voltage to said positioning means.

5. In a system for avoiding false null positioning of an object by a servomechanism arrangement employing a plurality of rotary transformers having rotor windings coupled to said object, a source of command signals representing selected rotational positions of said object, a first stator winding in each of said rotary transformers responsive when said command signals are applied to the respective rotor windings to develop an error voltage in accordance with the deviation between said selected position and the actual object position, the magnitude of said error voltage forming a substantial sinusoid when plotted as a function of said deviation, a second stator winding in one of said rotary transformers orthogonally positioned with respect to said first stator winding and responsive when said commmand signals are applied to the rotor winding therein to develop an output voltage which will be maximum when said error voltage in said first stator winding is zero, positioning means controlled by said error voltages when said deviation is within the region of 0° to position said object and controlled by said output voltage when said deviation is within the region of 180° to slew said object independently of said command signals to a position within the region of 0°.

References Cited in the file of this patent
UNITED STATES PATENTS

| | | |
|---|---|---|
| 2,455,364 | Hays | Dec. 7, 1948 |
| 2,762,003 | Jacks | Sept. 4, 1956 |
| 2,764,720 | Kelling | Sept. 25, 1956 |
| 2,798,992 | Adler et al. | July 9, 1957 |
| 2,861,232 | Willems | Nov. 18, 1958 |
| 2,933,666 | Gordon | Apr. 19, 1960 |
| 2,939,061 | Keenan | May 31, 1960 |

FOREIGN PATENTS

| | | |
|---|---|---|
| 601,518 | Great Britain | May 7, 1948 |